US011327467B2

(12) United States Patent
Ono

(10) Patent No.: US 11,327,467 B2
(45) Date of Patent: May 10, 2022

(54) INFORMATION PROCESSING DEVICE AND INFORMATION PROCESSING METHOD

(71) Applicant: SONY CORPORATION, Tokyo (JP)

(72) Inventor: Hideyuki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/335,124

(22) PCT Filed: Sep. 8, 2017

(86) PCT No.: PCT/JP2017/032431
§ 371 (c)(1),
(2) Date: Mar. 20, 2019

(87) PCT Pub. No.: WO2018/100829
PCT Pub. Date: Jun. 7, 2018

(65) Prior Publication Data
US 2019/0212719 A1  Jul. 11, 2019

(30) Foreign Application Priority Data
Nov. 29, 2016  (JP) .............................. JP2016-231522

(51) Int. Cl.
G05B 19/4155   (2006.01)
H04L 67/12    (2022.01)
(Continued)

(52) U.S. Cl.
CPC .......... G05B 19/4155 (2013.01); F24F 11/00 (2013.01); G06V 20/52 (2022.01);
(Continued)

(58) Field of Classification Search
CPC ....... G05B 19/4155; G08B 7/06; H04L 67/12; H04Q 9/00
See application file for complete search history.

(56) References Cited

U.S. PATENT DOCUMENTS 10,172,593 B2 * 1/2019 Shinar .................. A61B 5/4343
2008/0195257 A1 * 8/2008 Rauch .................... G08G 1/127
701/1
(Continued)

FOREIGN PATENT DOCUMENTS

CN   1503177 A   6/2004
EP   2312524 A1  4/2011
(Continued)

OTHER PUBLICATIONS

International Search Report and Written Opinion of PCT Application No. PCT/JP2017/032431, dated Nov. 28, 2017, 11 pages of ISRWO.

(Continued)

Primary Examiner — Vincent H Tran
(74) Attorney, Agent, or Firm — Chip Law Group

(57) ABSTRACT

An information processing device including a communication portion capable of receiving sensor data detected from a plurality of sensors arranged in predetermined regions and transmitting control signals to a plurality of actuators arranged around the sensors such that the actuators are, at least one by one, associated with each of the sensors. The information processing device further includes a control portion that performs control such that the sensor arranged in a specific region determined not to have an ideal situation is specified on the basis of the sensor data detected from the plurality of sensors, the actuator corresponding to the specified sensor is specified from the plurality of actuators, and the control signal for bringing the specific region into the ideal situation is generated and transmitted to the specified actuator through the communication portion.

10 Claims, 10 Drawing Sheets

(51) Int. Cl.

| | | |
|---|---|---|
| *G08B 7/06* | (2006.01) | |
| *H04Q 9/00* | (2006.01) | |
| *F24F 11/00* | (2018.01) | |
| *G08C 17/02* | (2006.01) | |
| *G08B 13/196* | (2006.01) | |
| *H04R 3/12* | (2006.01) | |
| *G08B 3/10* | (2006.01) | |
| *G06V 20/52* | (2022.01) | |
| *G06V 40/20* | (2022.01) | |

(52) U.S. Cl.
CPC ............ *G06V 40/20* (2022.01); *G08B 3/10* (2013.01); *G08B 7/06* (2013.01); *G08B 13/19602* (2013.01); *G08B 13/19613* (2013.01); *G08B 13/19615* (2013.01); *G08C 17/02* (2013.01); *H04L 67/12* (2013.01); *H04Q 9/00* (2013.01); *H04R 3/12* (2013.01); *G05B 2219/25011* (2013.01); *G05B 2219/34443* (2013.01); *H04Q 2209/10* (2013.01)

(56) References Cited

U.S. PATENT DOCUMENTS

| | | | | |
|---|---|---|---|---|
| 2009/0002178 | A1* | 1/2009 | Guday | G06F 3/0346 340/573.1 |
| 2011/0125327 | A1 | 5/2011 | Sankai | |
| 2012/0020518 | A1* | 1/2012 | Taguchi | G06T 7/292 382/103 |
| 2012/0041603 | A1* | 2/2012 | Wilmsen | G05D 23/1934 700/277 |
| 2012/0092167 | A1* | 4/2012 | Hohl | G06F 3/017 340/573.1 |
| 2012/0298348 | A1* | 11/2012 | Mise | F24F 11/62 165/287 |
| 2013/0120114 | A1* | 5/2013 | Gu | G06F 7/02 340/5.83 |
| 2014/0234815 | A1* | 8/2014 | Jang | A61B 5/165 434/236 |
| 2015/0053066 | A1* | 2/2015 | Hampiholi | G10H 1/0008 84/602 |
| 2015/0073748 | A1* | 3/2015 | Mattsson | G06Q 10/063 702/150 |
| 2015/0102745 | A1* | 4/2015 | Pijlman | H05B 47/175 315/291 |
| 2015/0127818 | A1* | 5/2015 | Bates | G06F 16/639 709/224 |
| 2015/0256032 | A1* | 9/2015 | Gatto | H02J 13/0017 307/35 |
| 2016/0035189 | A1* | 2/2016 | Rowe | G06Q 30/0235 463/25 |
| 2016/0201932 | A1* | 7/2016 | Endo | F24F 11/62 236/1 B |
| 2017/0032630 | A1* | 2/2017 | Gervais | G08B 6/00 |
| 2017/0053493 | A1* | 2/2017 | Rowe | G07F 17/3237 |
| 2017/0094014 | A1* | 3/2017 | Nakatsukasa | H04L 67/025 |
| 2017/0132475 | A1* | 5/2017 | Oami | G06M 11/00 |
| 2017/0193792 | A1* | 7/2017 | Bermudez Rodriguez | G08B 25/10 |
| 2017/0268793 | A1* | 9/2017 | Cardonha | G06K 9/00711 |
| 2018/0118522 | A1* | 5/2018 | Seki | B66B 27/00 |
| 2019/0088093 | A1* | 3/2019 | Gervais | G06F 3/016 |
| 2019/0104596 | A1* | 4/2019 | Den Hartog | H05B 47/12 |
| 2019/0156110 | A1* | 5/2019 | De Hoog | G06F 3/147 |
| 2019/0259066 | A1* | 8/2019 | Asukai | G06Q 30/0267 |
| 2020/0057460 | A1* | 2/2020 | Kwak | G06F 3/015 |
| 2020/0124307 | A1* | 4/2020 | Ota | G05B 19/042 |

FOREIGN PATENT DOCUMENTS

| | | |
|---|---|---|
| JP | 2004-178129 A | 6/2004 |
| JP | 2006-055931 A | 3/2006 |
| JP | 2008-055578 A | 3/2008 |
| JP | 2009-238548 A | 10/2009 |
| JP | 2012-139798 A | 7/2012 |
| JP | 2012-166904 A | 9/2012 |
| JP | 2012-197158 A | 10/2012 |
| JP | 2012-213828 A | 11/2012 |
| JP | 2012-227712 A | 11/2012 |
| JP | 2016-051675 A | 4/2016 |
| JP | 2016-103388 A | 6/2016 |
| WO | 2010/013572 A1 | 2/2010 |

OTHER PUBLICATIONS

Office Action for JP Patent Application No. 2018-553669 dated May 25, 2021, 06 pages of Office Action and 06 pages of English Translation.

* cited by examiner

FIG. 8
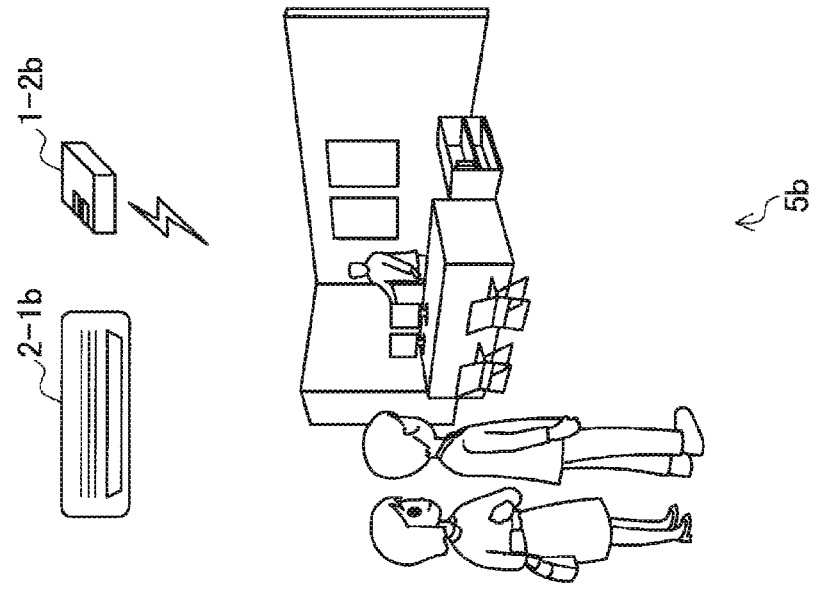
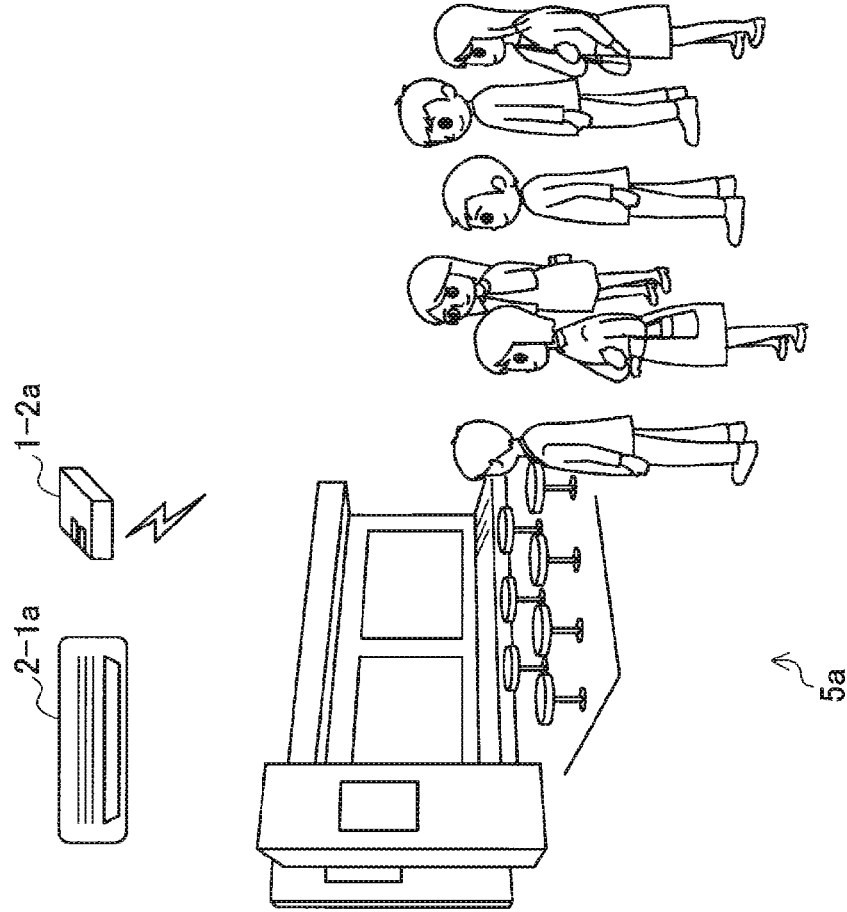

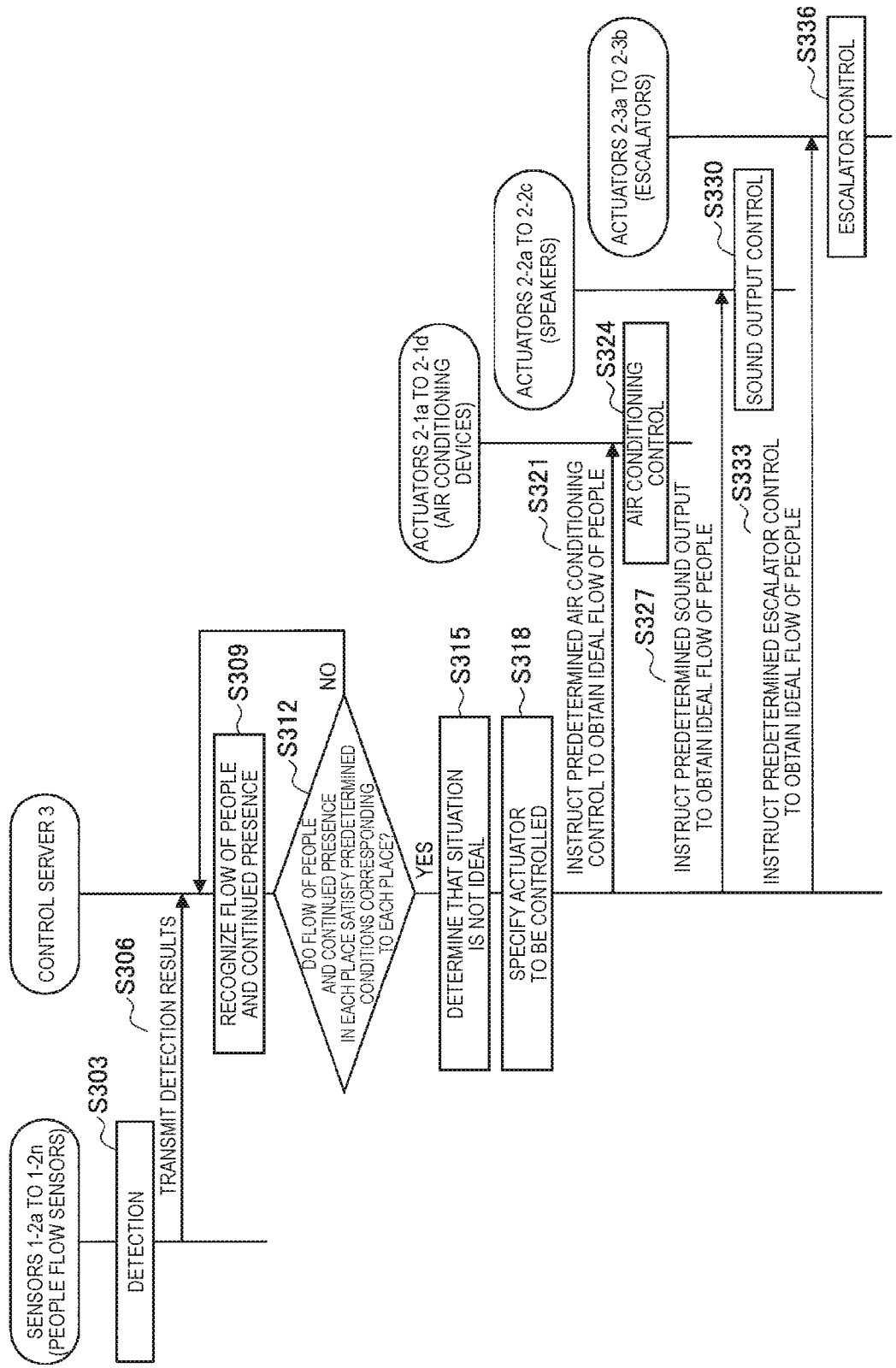

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/032431 filed on Sep. 8, 2017, which claims priority benefit of Japanese Patent Application No. JP 2016-231522 filed in the Japan Patent Office on Nov. 29, 2016. Each of the above-referenced applications is hereby incorporated herein by reference in its entirety.

TECHNICAL FIELD

The present disclosure relates to an information processing device and an information processing method.

BACKGROUND ART

In recent years, a robot apparatus that provides various services to people gathered in a commercial facility, an event hall, or the like has been proposed.

For example, Patent literature 1 below discloses a robot apparatus of a single body capable of executing a plurality of different services by switching between them. When such a robot apparatus detects the entry into a predetermined area while moving or observes a predetermined event, the robot apparatus is connected to a content stored in a server in response thereto and thus can provide a corresponding service.

Further, Patent literature 2 below discloses a mobile robot that learns an action with which gathering and flowing of people are minimized/maximized from a reaction situation of people nearby to its own action and takes a proper action matching a service to be provided.

Further, Patent literature 3 below discloses a robot that detects an adult, a child, a baby, and the like from the height or a height of the face of a customer visiting a store, as well as a congestion degree of the customers, selects optimal information for each customer from a table, and provide it to the customer by displaying, generating a sound, or showing a gesture. The robot further makes a movement to effectively provide explanation and guidance.

Further, Patent literature 4 below discloses that a service provided by a robot system is improved by calculating an atmosphere score of a place on the basis of the condition and the gazing condition of the place where at least one of robots that autonomously move in a facility is presently located, and appropriately changing an action of the robot in accordance with an estimation result of the atmosphere of the place. Specifically, Patent literature 4 discloses that, for example, if the place has the gloomy atmosphere, the robot can be caused to perform an action of calling on the user and an action of attracting the attention of the user.

CITATION LIST

Patent Literature

Patent Literature 1: JP 2006-55931A
Patent Literature 2: JP 2012-139798A
Patent Literature 3: JP 2008-55578A
Patent Literature 4: JP 2012-213828A

DISCLOSURE OF INVENTION

Technical Problem

However, all of these inventions can only handle the situation around the place where the robot actually comes across, and it is difficult to grasp a flow of people, a situation of excitement, and the like in the entire hall.

Thus, the present disclosure proposes an information processing device and an information processing method capable of grasping the situation of the place using a plurality of arranged sensors and controlling arranged actuators so as to obtain the ideal situation.

Solution to Problem

According to the present disclosure, there is proposed an information processing device including: a communication portion capable of receiving sensor data detected from a plurality of sensors arranged in predetermined regions and transmitting control signals to a plurality of actuators arranged around the sensors such that the actuators are, at least one by one, associated with each of the sensors; and a control portion that performs control such that the sensor arranged in a specific region determined not to have an ideal situation is specified on the basis of the sensor data detected from the plurality of sensors, the actuator corresponding to the specified sensor is specified from the plurality of actuators, and the control signal for bringing the specific region into the ideal situation is generated and transmitted to the specified actuator through the communication portion.

According to the present disclosure, there is proposed an information processing method including, by a processor: receiving sensor data detected from a plurality of sensors arranged in predetermined regions by means of a communication portion capable of receiving the sensor data detected from the plurality of sensors arranged in the predetermined regions and transmitting control signals to a plurality of actuators arranged around the sensors such that the actuators are, at least one by one, associated with each of the sensors; specifying the sensor arranged in a specific region determined not to have an ideal situation on the basis of the sensor data detected from the plurality of sensors; specifying the actuator corresponding to the specified sensor from the plurality of actuators; and generating the control signal for bringing the specific region into the ideal situation, and transmitting the control signal to the specified actuator through the communication portion.

Advantageous Effects of Invention

As described above, according to the present disclosure, it becomes possible to grasp the situation of the place by means of the plurality of arranged sensors and control the arranged actuators so as to obtain the ideal situation.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is an explanatory diagram illustrating an outline of a second example.

FIG. 11 is a sequence diagram illustrating operation processing of the third example.

MODE(S) FOR CARRYING OUT THE INVENTION

Figure 1:
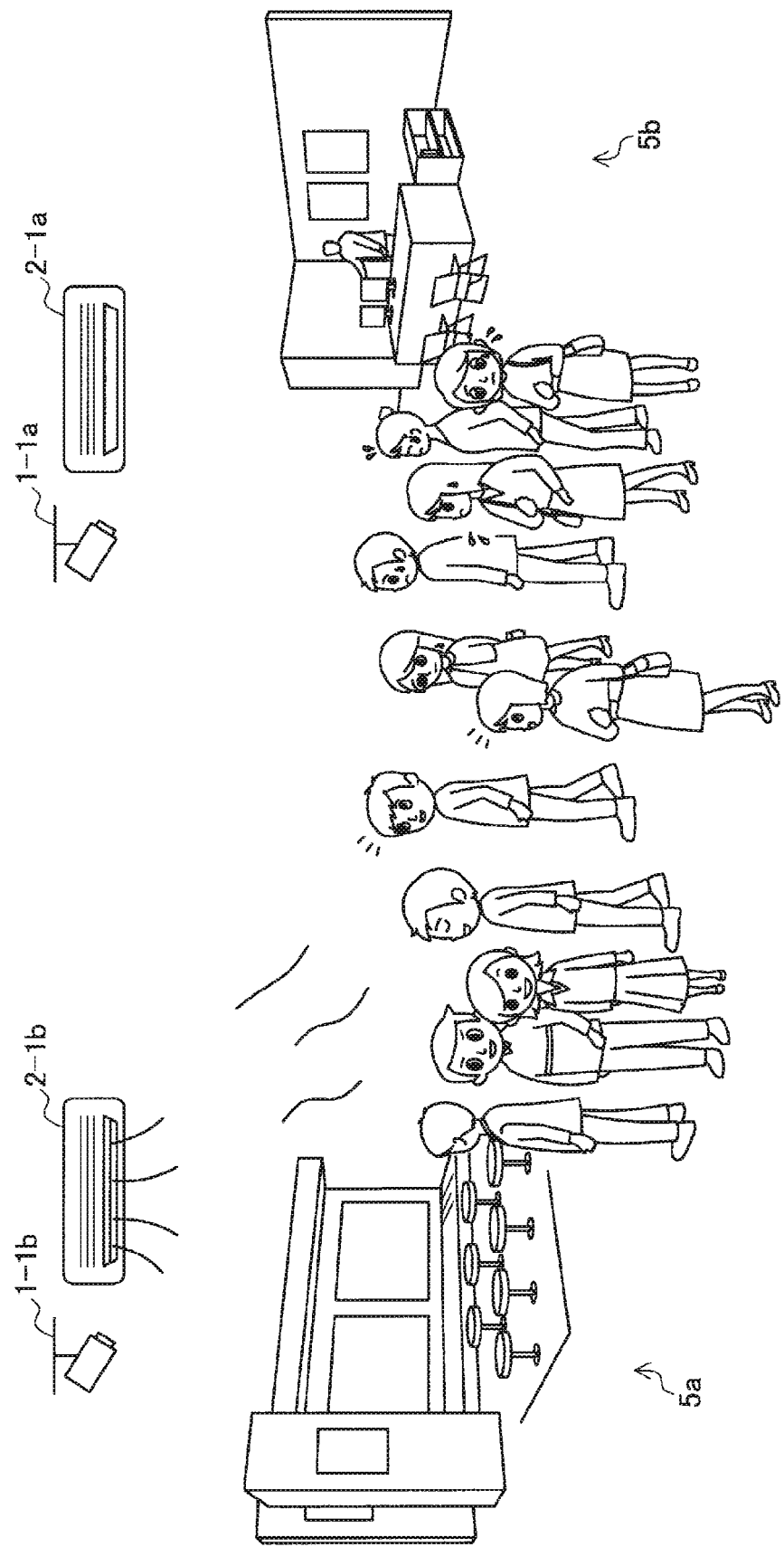
FIG. 1 is an explanatory diagram illustrating an outline of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided in the following order.

1. Outline of information processing system according to one embodiment of present disclosure
2. Configurations
2-1. Overall configuration
2-2. Configuration of sensor terminal 1
2-3. Configuration of actuator device 2
2-4. Configuration of control server 3
3. Examples
3-1. First example
3-2. Second example
3-3. Third example
3-4. Others
4. Summary

1. OUTLINE OF INFORMATION PROCESSING SYSTEM ACCORDING TO ONE EMBODIMENT OF PRESENT DISCLOSURE

FIG. 1 is an explanatory diagram illustrating an outline of an information processing system according to an embodiment of the present disclosure. As shown in FIG. 1, for example, a plurality of cameras (sensor terminals 1-1a and 1-1b) arranged in an exhibition hall or the like can be used to grasp a flow of people, a situation of excitement, and the like in the hall. Further, in each of areas where the cameras are arranged, an air conditioning device (an actuator device 1-2) such as an air conditioner is arranged.

Here, for example, in a situation in which an event will start soon in an area 5a and people are particularly expected to visit the area 5a, if people are not gathered in the area 5a as expected, the information processing system according to the present embodiment controls the air conditioning device (the actuator device 1-2) so as to obtain the ideal situation by gathering people in the area 5a.

Specifically, people nearby can be attracted to the area 5a by controlling, for example, a setting temperature and air volume of the air conditioning device (an actuator device 1-2a) arranged in the area 5a to the comfortable temperature and air volume. A comfortable space can be provided by, for example, performing control to lower the temperature in a hot day and increase the temperature in a cold day. Note that the present embodiment is not limited to the control of the temperature and the air volume, and, if applicable, humidity may be also controlled to a comfortable condition.

In addition, by further controlling the setting temperature and air volume of the air conditioning device (an actuator device 1-2b) arranged in an area 5b in another place to the uncomfortable temperature and air volume, people in the area 5b can be guided to the more comfortable area 5a as shown in FIG. 1.

As described above, the information processing system according to the present embodiment can perform the pinpoint control of the situation of the place to the ideal situation without grasping positional information by using the sensor terminals 1 and the actuator devices 2 scattered in predetermined regions and controlling the actuator device 2 corresponding to the sensor terminal 1 that detects the non-ideal situation. Examples of the situation of the place include a flow of people, a motion line, continued presence of people, a degree of excitement, and the like. Examples of the non-ideal situation include people not moving as expected, a lack of people, people not being excited, and the like.

Note that a camera is used as the sensor terminal 1 in the example shown in FIG. 1, however, the present embodiment is not limited to this example and other sensors capable of detecting the situation of the place, such as, for example, a microphone and a people-flow sensor, may be used. Further, the sensor terminal 1 may be a multisensor including plural kinds of sensors.

Further, the air conditioning device is used as the actuator device 2 in the example shown in FIG. 1, however, the present embodiment is not limited to this example and other actuators capable of controlling the situation of the place, such as, for example, an electric fan, a humidifier, a lighting device, a speaker, a vibration apparatus, and a display device, may be used. Further, a plurality of the actuator devices 2 may be arranged in each area.

Hereinabove, the information processing system according to one embodiment of the present disclosure has been described. Next, a configuration of the information processing system according to the present embodiment will be described with reference to FIG. 2 to FIG. 5.

2. CONFIGURATIONS

Figure 2:
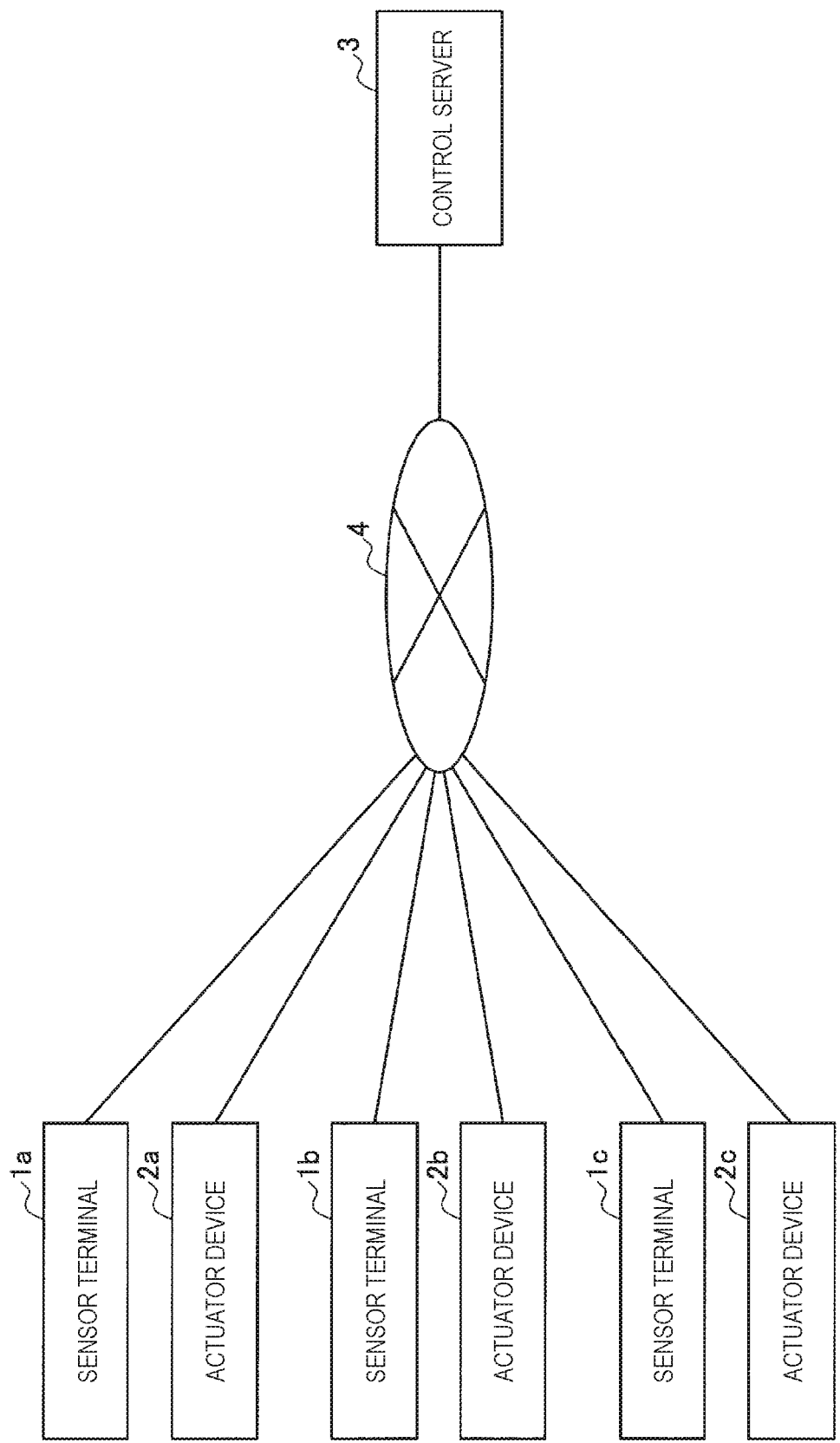
FIG. 2 is a diagram illustrating an example of an overall configuration of the information processing system according to the present embodiment.

<2-1. Overall Configuration>
FIG. 2 is a diagram illustrating an example of an overall configuration of the information processing system according to the present embodiment. As shown in FIG. 2, the information processing system according to the present embodiment includes the sensor terminals 1 (1a to 1c) discretely arranged in predetermined regions for detecting the situation of the place, the actuator devices 2 (2a to 2c) discretely arranged in predetermined regions for controlling the situation of the place, and a control server 3. The sensor terminals 1, the actuator devices 2, and the control server 3 are connected via a network 4 for allowing the transmission and reception of data. Further, it is presupposed that at least one sensor terminal 1 is associated with at least one actuator device 2 and they are arranged in the same area. The control server 3 determines the situation of the place on the basis of sensor information obtained from the plurality of sensor terminals 1. If the situation is not ideal, the control server 3 controls the situation of the place to be ideal using the corresponding actuator device 2.

A configuration of each device of such an information processing system will be described in detail below.

<2-2. Configuration of Sensor Terminal 1>

Figure 3:
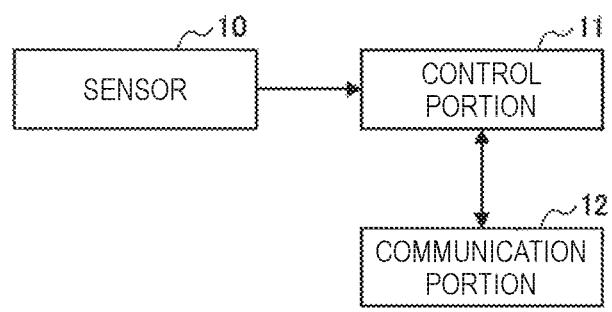
FIG. 3 is a block diagram illustrating an example of a configuration of a sensor terminal according to the present embodiment.

FIG. 3 is a block diagram illustrating an example of a configuration of the sensor terminal 1 according to the present embodiment. As shown in FIG. 3, the sensor terminal 1 includes a sensor 10, a control portion 11, and a communication portion 12.

The sensor 10 detects data from which the situation of the place can be determined. For example, the sensor 10 is implemented by a camera, a microphone, a people-flow sensor, an environment sensor, or the like. Further, the sensor terminal 1 may include a plurality of sensors. The people-flow sensor can grasp the number of communication terminals existing in the place and obtain a staying period (so-called continued presence) of each device by receiving radio waves emitted from the communication terminals possessed by people nearby by means of Wi-Fi (registered trademark), Bluetooth (registered trademark), or the like and totalizing detected information. Further, personally identifiable information can be sometime obtained from the radio wave emitted from the communication terminal, and, in this case, the continued presence of each person and the flow of people can be more precisely grasped.

The control portion 11 functions as an arithmetic processing device and a control device and controls overall operations in the sensor terminal 1 in accordance with various programs. The control portion 11 is implemented by, for example, an electronic circuit such as a central processing unit (CPU) and a microprocessor. Further, the control portion 11 may include a read only memory (ROM) for storing a program, an arithmetic parameter, and the like to be used and a random access memory (RAM) for temporarily storing a parameter and the like that appropriately change.

Further, the control portion 11 according to the present embodiment performs control so as to continuously transmit sensor data detected by the sensor 10 from the communication portion 12 to the control server 3 via the network 4.

The communication portion 12 is connected to the network 4 in a wired or wireless manner for transmitting and receiving data with the control server 3 on the network. Specifically, the communication portion 12 is communicably connected with the network 4 by means of, for example, a wired/wireless local area network (LAN), Wi-Fi (registered trademark), a portable communication network (Long Term Evolution (LTE), the third generation of mobile telecommunications system (3G)), or the like and transmits the sensor data under the control of the control portion 11.

<2-3. Configuration of Actuator Device 2>

Figure 4:
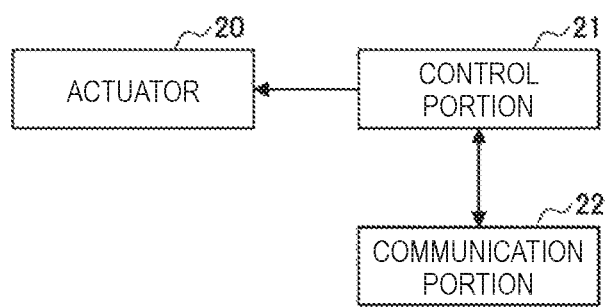
FIG. 4 is a block diagram illustrating an example of a configuration of an actuator device according to the present embodiment.

FIG. 4 is a block diagram illustrating an example of a configuration of the actuator device 2 according to the present embodiment. As shown in FIG. 4, the actuator device 2 includes an actuator 20, a control portion 21, and a communication portion 22.

The actuator 20 is an output device which can cause changes in feelings and actions of people present in the place in order to control the situation of the place. For example, the actuator 20 is implemented by a speaker (control of a sound and a sound volume), a display portion (control of a display content), a lighting portion (control of brightness and a color tone), an air conditioning control portion (control of a temperature, an air volume, and a humidity), a driving portion (e.g., control of a direction of escalator), or the like.

The control portion 21 functions as an arithmetic processing device and a control device and controls overall operations in the actuator device 2 in accordance with various programs. The control portion 21 is implemented by, for example, an electronic circuit such as a central processing unit (CPU) and a microprocessor. Further, the control portion 21 may include a read only memory (ROM) for storing a program, an arithmetic parameter, and the like to be used and a random access memory (RAM) for temporarily storing a parameter and the like that appropriately change.

Further, the control portion 21 according to the present embodiment controls the actuator so as to control the situation of the place in accordance with a control signal received from the control server 3 via the network 4 using the communication portion 22. For example, the control portion 21 controls the sound and sound volume, the display content, the brightness and color tone, the air conditioning, the direction of escalator, and the like.

The communication portion 22 is connected to the network 4 in a wired or wireless manner for transmitting and receiving data with the control server 3 on the network. Specifically, the communication portion 22 is communicably connected with the network 4 by means of, for example, a wired/wireless local area network (LAN), Wi-Fi (registered trademark), a portable communication network (Long Term Evolution (LTE), the third generation of mobile telecommunications system (3G)), or the like to receive the control signal.

<2-4. Configuration of Control Server 3>

Figure 5:
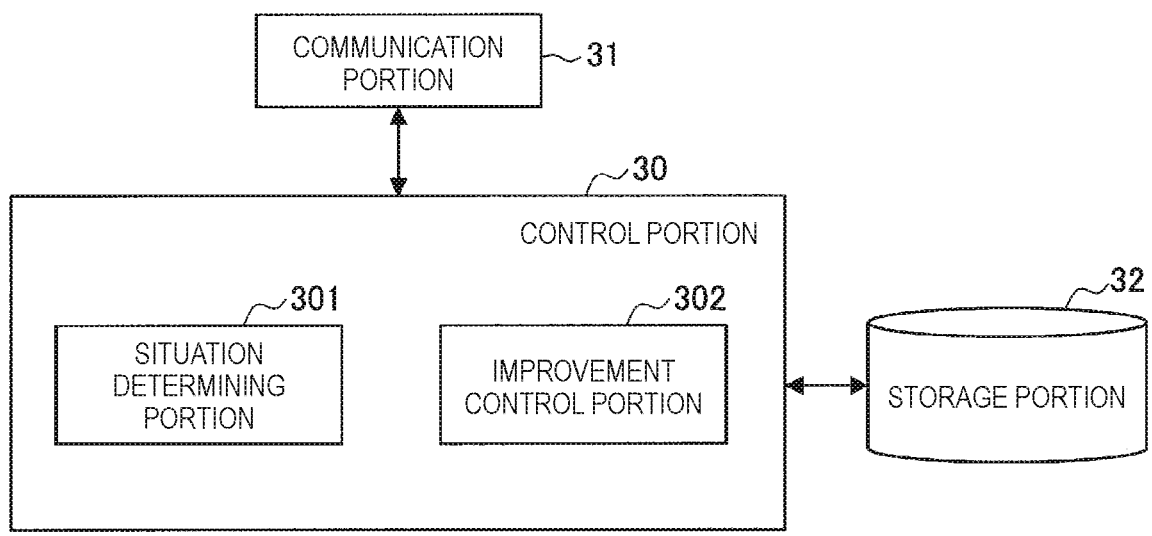
FIG. 5 is a block diagram illustrating an example of a configuration of a control server according to the present embodiment.

FIG. 5 is a block diagram illustrating an example of a configuration of the control server 3 according to the present embodiment. As shown in FIG. 5, the control server 3 (the information processing device) includes a control portion 30, a communication portion 31, and a storage portion 32.

(Control Portion 30)

The control portion 30 functions as an arithmetic processing device and a control device and controls overall operations in the control server 3 in accordance with various programs. The control portion 30 is implemented by, for example, an electronic circuit such as a central processing unit (CPU) and a microprocessor. Further, the control portion 30 may include a read only memory (ROM) for storing a program, an arithmetic parameter, and the like to be used and a random access memory (RAM) for temporarily storing a parameter and the like that appropriately change.

Further, the control portion 30 according to the present embodiment also functions as a situation determining portion 301 and an improvement control portion 302.

The situation determining portion 301 determines whether the situation of the place is ideal or not on the basis of the sensor data transmitted from the sensor terminal 1. For example, the situation determining portion 301 determines whether or not the flow of people, the motion line, the continued presence of people, the degree of excitement, or the like in a specific region is in the ideal situation.

The improvement control portion 302 performs control so as to generate the control signal for controlling the situation of the place in the specific region determined not to have an ideal situation by the situation determining portion 301 to the ideal situation, and transmit the control signal from the communication portion 31 to the actuator device 2 in the target place. That is, the improvement control portion 302 performs the control so as to specify the actuator device 2 corresponding to the sensor terminal 1 arranged in the specific region determined not to have the ideal situation, generate the control signal for bringing the specific region into the ideal situation, and transmit the control signal to the specified actuator device 2 via the communication portion 31.

Note that the ideal situation may be determined and the control method of the actuator device 2 in the non-ideal situation may be performed in accordance with a rule stored in the storage portion 32 or on the basis of a learning result obtained after learning how the situation changes by controlling the actuator device 2.

(Communication Portion 31)

The communication portion 31 is connected to the network 4 in a wired or wireless manner for transmitting and receiving data with the sensor terminal 1 and the actuator device 2 via the network 4. The communication portion 31 is communicably connected with the network 4 by means of, for example, a wired/wireless LAN (Local Area Network), Wi-Fi (Wireless Fidelity, registered trademark), LTE (Long Term Evolution), or the like. The communication portion 31 according to the present embodiment receives the detected sensor data from the plurality of sensor terminals 1 arranged in the predetermined regions and transmits the control signal to at least one or more of the plurality of actuator devices 2 arranged around the sensor terminals 1 such that the actuators devices 2 are, at least one by one, associated with each of the sensor terminals 1.

(Storage Portion 32)

The storage portion 32 is implemented by ROM for storing a program, an arithmetic parameter, and the like to be used in the processing of the control portion 30 and RAM for temporarily storing a parameter and the like that appropriately change. For example, the storage portion 32 according to the present embodiment stores a place situation determining parameter and an improvement control rule.

3. EXAMPLES

Next, the information processing system according to the present embodiment will be described in detail using a plurality of examples.

3-1. First Example

First, a first example will be described with reference to FIG. 6 and FIG. 7.

Figure 6:
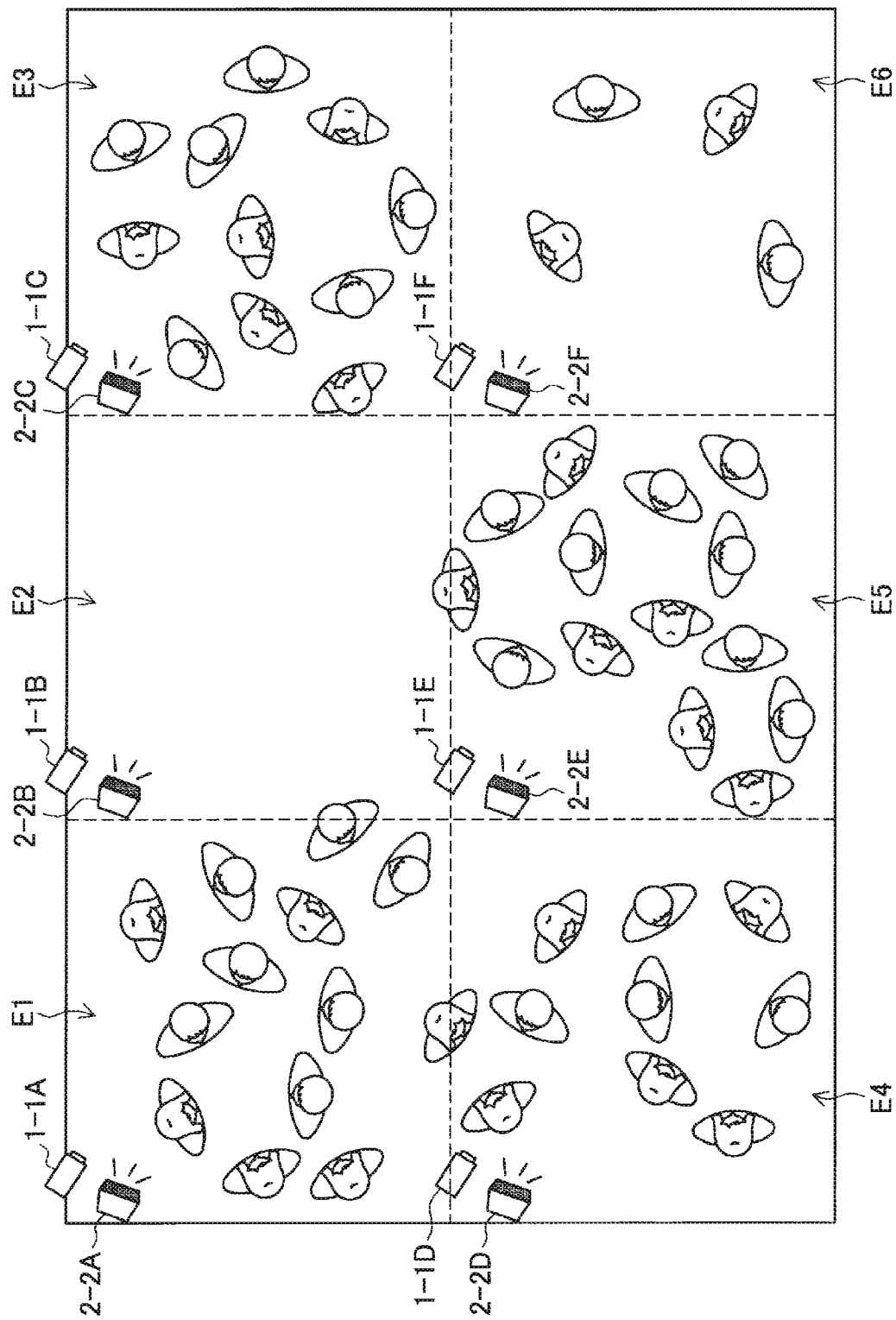
FIG. 6 is an explanatory diagram illustrating an outline of a first example.

FIG. 6 is an explanatory diagram illustrating an outline of the first example. A party place in a hall or the like is assumed in the first example. The organizer expects that all of the participants enjoy and get excited with the party. However, in some areas, the situation rises where people do not get excited with the party, and, as a result, the party may receive poor evaluations from a part of the participants. Thus, in the present example, the party place is divided into several areas (areas E1 to E6) as shown in FIG. 6, a camera (a sensor terminal 1-1) and a speaker (an actuator device 2-2) are arranged in each area, and the excitement of people (a degree of excitement) is determined by the camera in each area. Then, if the camera detects the area where people do not get excited with the party (if the degree of excitement does not satisfy a reference value), control is performed so as to output a sound for livening up the place using the speaker (the actuator device 2-2) arranged in such an area for improvement.

Operation processing in such a first example will be described with reference to FIG. 7. FIG. 7 is a sequence diagram illustrating the operation processing of the first example.

Figure 7:
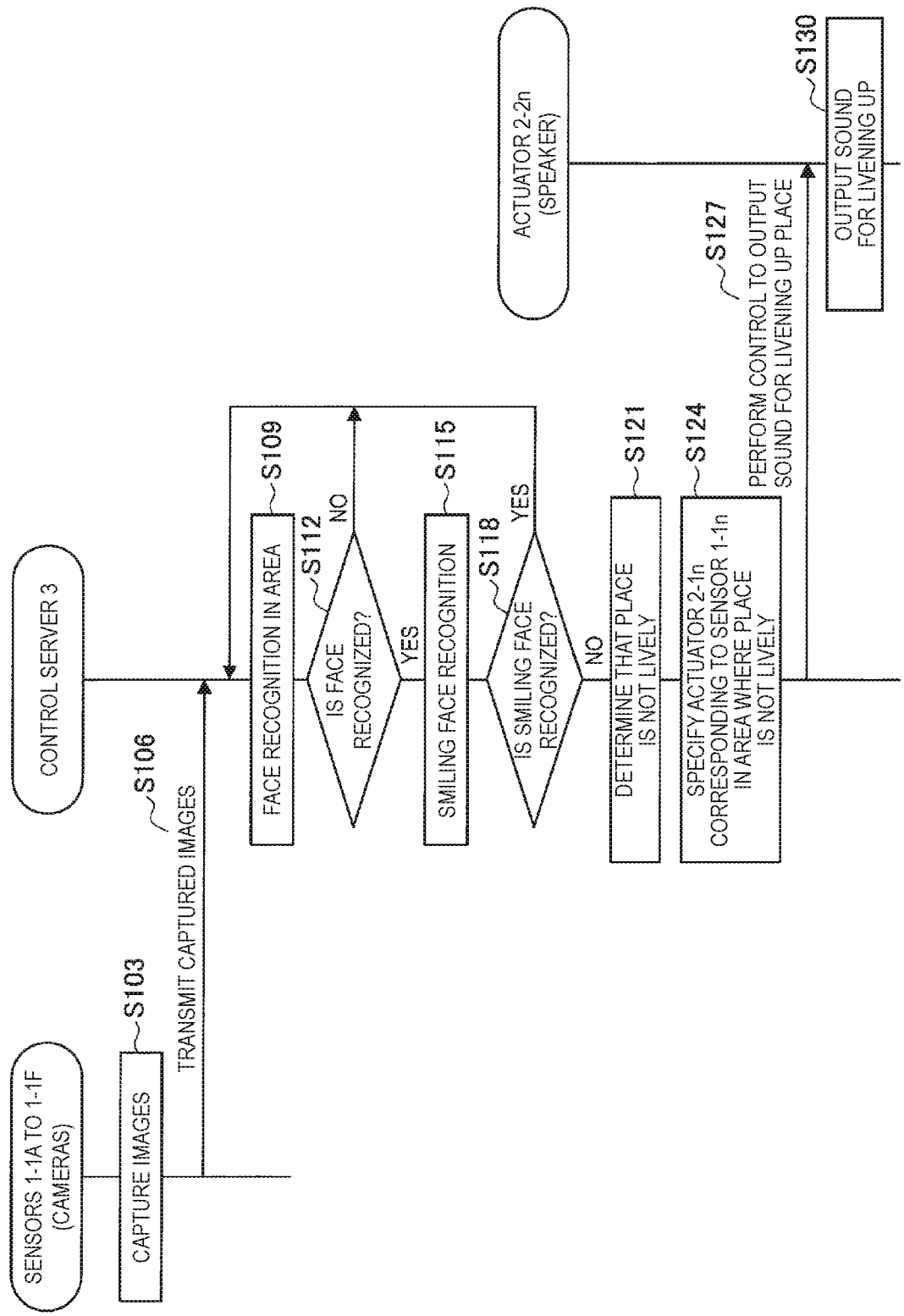
FIG. 7 is a sequence diagram illustrating operation processing of the first example.

As shown in FIG. 7, first, all cameras (sensor terminals 1-1A to 1-1F) arranged in the place capture images in the areas (Step S103) and the captured images (sensor data) are transmitted to the control server 3 (Step S106). Acquisition and transmission of the captured images are continuously performed.

Next, the control server 3 performs face recognition in the captured images transmitted from each camera by the situation determining portion 301 (Step S109).

Next, if a predetermined number or more (e.g., two or more) of faces are recognized (Step S112/Yes), the presence of people in that area is recognized, and then the situation determining portion 301 further performs smiling face recognition on the basis of the captured images (Step S115). Note that, if no face is recognized, the absence of people in that area is recognized (e.g., an area E2 in FIG. 6), making an improvement or the like for livening up the place unnecessary.

Next, if the smiling face is not recognized in the area (Step S115/No), the situation determining portion 301 determines that the situation of the place in that area is not lively (Step S121). In this manner, in the present example, the area where people are present (gathering) but not being excited (e.g., an area E6 in FIG. 6) is determined. Note that the situation determining portion 301 may determine that the place is not lively by calculating an average value of smiling degrees of people present in that area and finding the average value being lower than a reference value, or by recognizing at least one person with non-smiling face. Further, in the present example, the smiling degree is used as an example of the degree of excitement and, if the smiling degree satisfies the reference value (if the average value is above the reference value), the place is determined to be lively.

Next, the improvement control portion 302 specifies an actuator device 2-2*n* (a speaker) corresponding to a sensor terminal 1-1*n* (a camera) in an area En determined to be not lively (Step S124). For example, if the area E6 is determined to be not lively on the basis of the captured images captured by the sensor terminal 1-1F (the camera) in the area E6, a corresponding actuator device 2-2F (a speaker) is specified.

Next, the improvement control portion 302 generates the control signal that performs control so as to output a sound for livening up the place using the specified actuator device 2-1*n* and transmit the control signal to the actuator device 2-1*n* (Step S127).

Then, the actuator device 2-1*n* outputs the sound for livening up the place in accordance with the instruction of the control server 3 (Step S130). The sound for livening up the place may be, for example, a high spirited music, a music with good rhythm, or the like. Playing such a music can improve the feelings of people present in the area where the place is not lively. Further, in addition to music, information leading to a conversation topic that can be shared by people present in that area may be provided. For example, a voice message such as "This is the third time this party has being held. Have you attended this party before?" can be outputted to give the people present in that area an opportunity of starting conversation such as "Have you attended this party before?" and "I have attended all three parties".

Hereinabove, the first example has been described in detail. Note that whether the place is lively or not is not necessary determined only by the smiling face recognition. For example, a microphone is used as the sensor terminal 1, and whether the place is lively or not may be determined by voice recognition of laughter and cheering using voice recognition of the microphone or on the basis of whether or not a certain level of voice volume is observed. Further, the situation determining portion 301, which recognizes how many people are having conversations by performing sound source separation with voice signal processing, can determine that the place is lively if, for example, two or more people are having conversations.

3-2. Second Example

Next, a second example will be described with reference to FIG. 8 and FIG. 9.

FIG. 8 is an explanatory diagram illustrating an outline of the second example. In the second example, an explanation is given of a case where the arranged actuator device 2 is controlled so as to gather people in a predetermined area (so as to facilitate the ideal movement, flow of people, and continued presence) in accordance with the situation of the place detected by the sensor terminal 1.

For example, as shown in FIG. 8, in a commercial facility, an exhibition hall, or the like, in a situation in which an event will start soon in an area 5b, but people are not gathered as expected, the ideal situation can be achieved by controlling the arranged actuator device 2-1 (the air conditioning device) to attract the people in the area 5b. The number of people in each area can be detected by the arranged sensor terminal 1-2 (the people-flow sensor).

For example, in a hot day in summer, people nearby can be attracted to the area 5b by lowering the temperature using an actuator device 2-1b (an air conditioning device) in the area 5b and thereby providing a comfortable space. Further, it is possible to guide people present in the area 5a to the area 5b by further controlling an actuator device 2-1a (an air conditioning device) in other areas (e.g., the area 5a). Specifically, for example, in a hot day in summer, the actuator device 2-1b (the air conditioning device) arranged in the area 5a is stopped to increase the temperature and the humidity in the area 5a. As a result, the area 5a is brought into an uncomfortable condition and people in the area 5a can be guided to the more comfortable area 5b.

Operation processing in such a second example will be described with reference to FIG. 9. FIG. 9 is a sequence diagram illustrating the operation processing of the second example.

Figure 9:
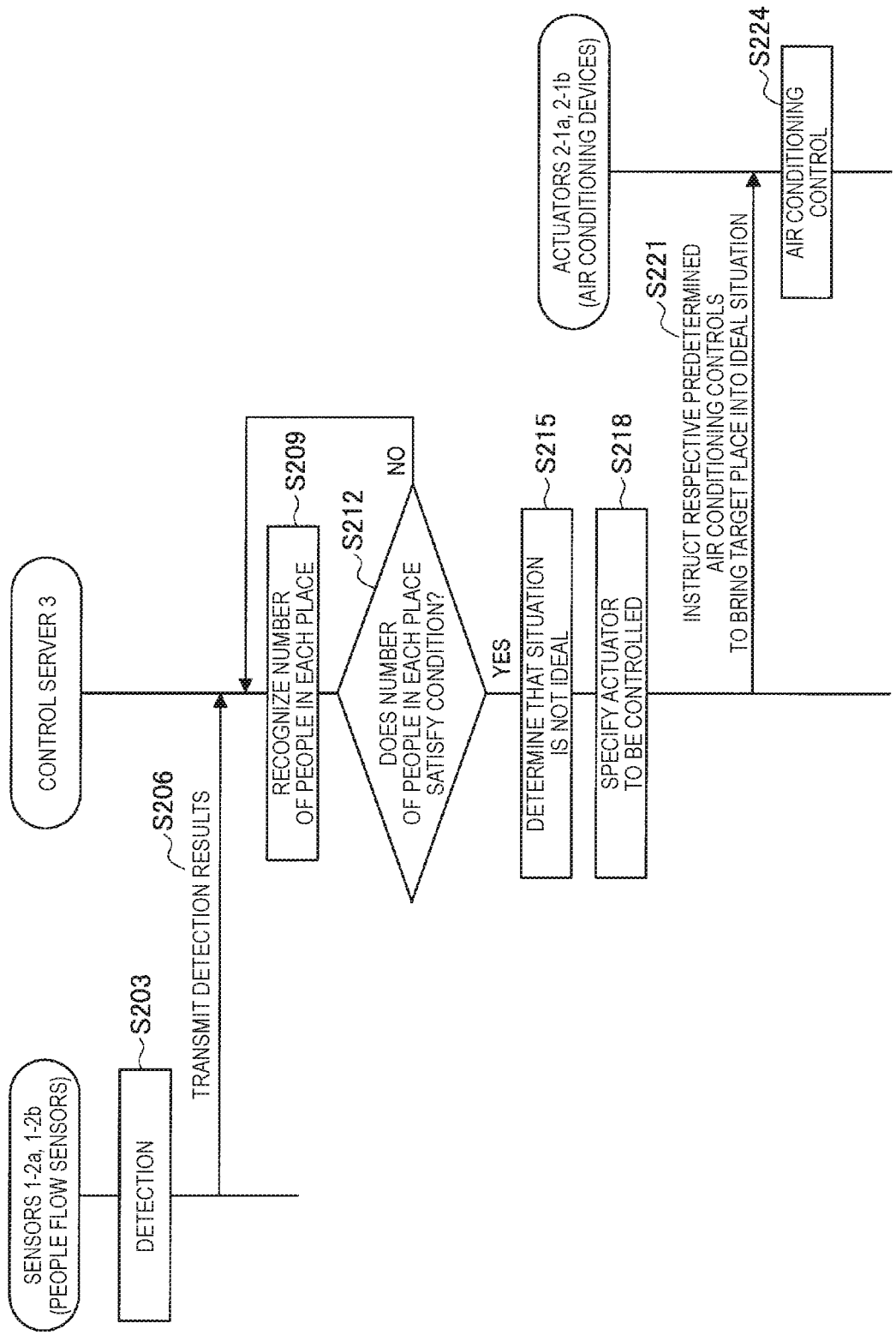
FIG. 9 is a sequence diagram illustrating operation processing of the second example.

As shown in FIG. 9, first, all people-flow sensors (sensor terminals 1-2a and 1-2b) arranged in the facility detect the number of people in the areas (Step S203) and transmit detection results (sensor data) to the control server 3 (Step S206). Such detection and transmission of the number of people are continuously performed.

Next, the control server 3 recognizes the number of people in each place on the basis of the detection result transmitted from each people-flow sensor by the situation determining portion 301 (Step S209).

Next, the situation determining portion 301 determines whether or not the number of people in each place satisfies a condition (Step S212). If the condition is not satisfied (Step S212/Yes), the situation is determined to be not ideal (Step S215). For example, in an event where 300 people are expected to visit the area 5b, if the current number of people in the area 5b is less than 300, the area 5b is determined to be not in the ideal situation. Further, if a predetermined number or more of people are gathered in the area 5a where no particular event is to be held, the area 5a is determined to be not in the ideal situation.

Next, the improvement control portion 302 specifies the actuator device 2-1 to be controlled (Step S218). Specifically, the improvement control portion 302 specifies the actuator device 2-1 (the air conditioning device) corresponding to the sensor terminal 1-2 (the people-flow sensor) in the area determined to be not in the ideal situation. For example, if the area 5b is determined to be not in the ideal situation (the expected number of visitors is not satisfied) on the basis of the detection result of the sensor terminal 1-2b (the people-flow sensor) in the area 5b, the improvement control portion 302 specifies the corresponding actuator device 2-1b (the air conditioning device). Further, the improvement control portion 302 may also specify the actuator device 2-1a (the air conditioning device) in the area 5a where the predetermined number or more of people are gathered, thus resulting in a non-ideal situation.

Next, in order to bring the target place (e.g., the area 5a and the area 5b) into an ideal situation, the improvement control portion 302 instructs the actuator devices 2-1a and 2-1b to perform respective predetermined air conditioning controls (Step S221), and then the actuator devices 2-1a and 2-1b perform the predetermined air conditioning controls (Step S224). Specifically, for example, in a hot day in summer, the improvement control portion 302 performs the control such that the setting temperature of the actuator device 2-1b (the air conditioning device) in the area 5b is increased to turn down the air volume, while the setting temperature of the actuator device 2-1a (the air conditioning device) in the area 5a is lowered to turn up the air volume. In this manner, it can be expected that people in the area 5a feel the heat and move toward the area 5b to cool off. Note that it is sufficient if the control of the setting temperature is reversed in the winter season.

Hereinabove, the second example has been described in detail. Note that the number of people in each area can be detected not only by the people-flow sensor but also by a camera or a microphone. Further, people can be guided directly by a speaker or attracted by a cool sound of Furin (a Japanese wind-bell) or the like.

Further, in the present example, the actuator devices 2-1 (the air conditioning devices) are arranged both in the areas 5a and 5b to control both areas, however, the present example is not limited thereto, and the situation of the place in the target area can be improved by controlling the setting temperature and the air volume of the actuator device 2-1 (the air conditioning device) arranged in one of the areas. For example, the actuator device 2-1 (the air conditioning device) in another specific region other than the specific region where people are expected to gather is controlled into an uncomfortable situation. In this manner, people can be guided to the specific region having a relatively comfortable situation.

3-3. Third Example

Next, a second example will be described with reference to FIG. 10 and FIG. 11.

Figure 10:
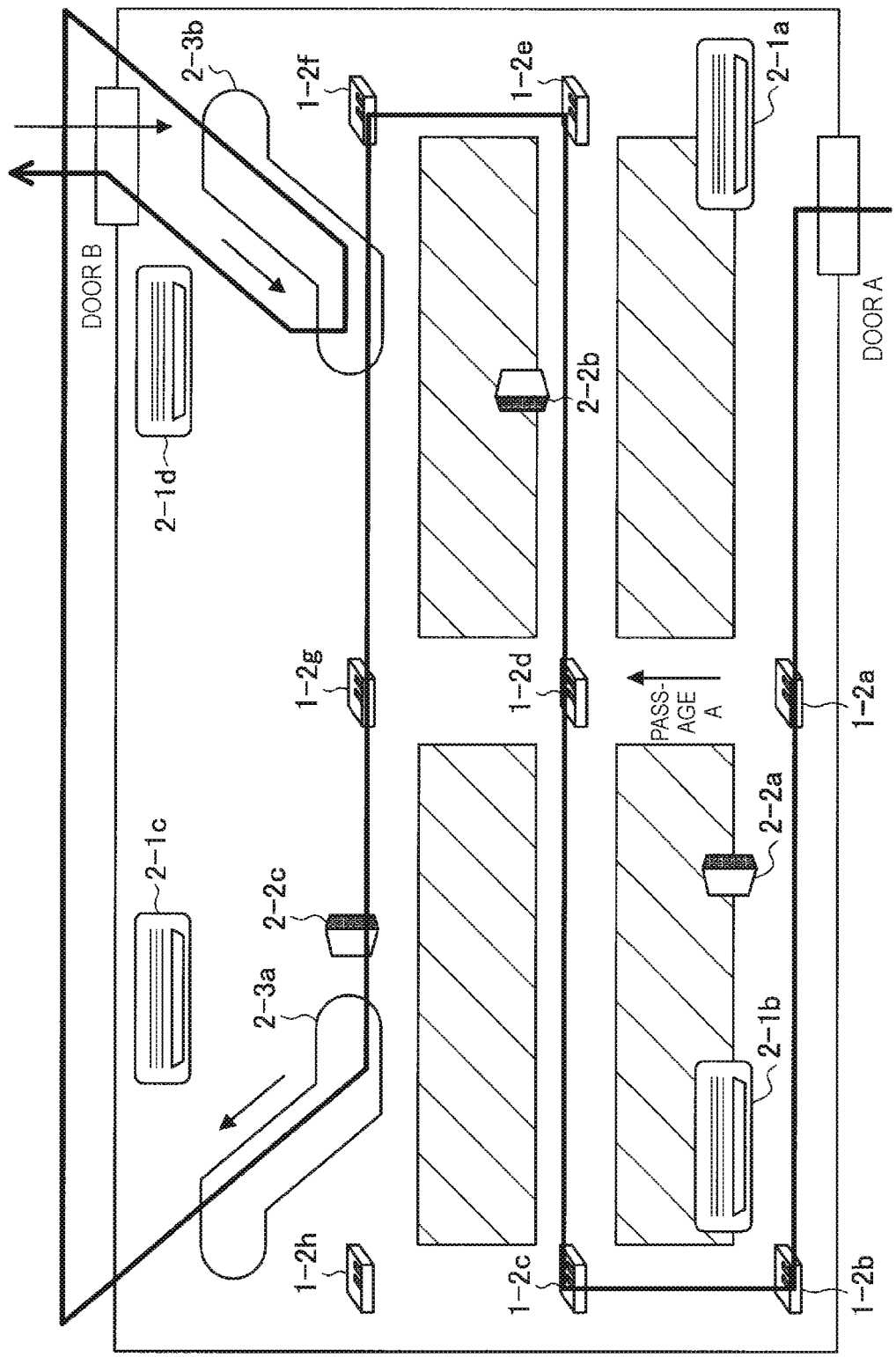
FIG. 10 is an explanatory diagram illustrating an outline of a third example.

FIG. 10 is an explanatory diagram illustrating an outline of the third example. In the third example, an explanation is given of a case where the arranged actuator device 2 is controlled so as to move people along a desired motion line in accordance with the situation of the place detected by the sensor terminal 1.

For example, as shown in FIG. 10, a route from a door A as an entrance to a door B as an exit is assumed in an exhibition hall or the like, however, people do not always follow the route. In the route shown in FIG. 10, the organizer expects people to enter from the door A first, see the exhibitions while passing through the first floor as shown by an arrow, go up to the second floor by an escalator (an actuator device 2-3*a*) and see the exhibitions on the second floor, go down to the first floor by an escalator (an actuator device 2-3*b*) on the opposite side, and then exit from the door B. However, some people may turn to a passage A and take a route in which they miss some of the exhibitions. It is also possible that people wrongly entering from the exit door B pause without understanding the route or bump into a person exiting from the door B through the regular route.

Thus, in the present example, the flow of people in such an exhibition hall or the like is detected by a plurality of people-flow sensors (sensor terminals 1-2*a* to 1-2*h*) arranged in the hall, and a plurality of various actuator devices 2-1 (the air conditioning device), 2-2 (the speaker), and 2-3 (the escalator) arranged in the hall are controlled so as to obtain the ideal flow of people (motion line).

Operation processing in such a third example will be described with reference to FIG. 11. FIG. 11 is a sequence diagram illustrating the operation processing of the third example.

As shown in FIG. 11, first, all people-flow sensors (the sensor terminals 1-2*a* to 1-2*h*) arranged in the hall detect the number of people in the areas (Step S303) and transmit detection results (sensor data) to the control server 3 (Step S306). Such detection and transmission of the number of people are continuously performed.

Next, the control server 3 recognizes the flow of the people (the motion line) in the hall and the continued presence of people in each place on the basis of the detection result transmitted from each people-flow sensor by the situation determining portion 301 (Step S309).

Next, the situation determining portion 301 determines whether or not the flow of people or the continued presence of people in each place satisfies a predetermined condition corresponding to each place (Step S312).

Next, if the flow of people or the continued presence of people does not satisfy the predetermined condition (Step S312/Yes), the situation determining portion 301 determines that the situation is not ideal (Step S315). For example, as shown in FIG. 10, in the ideal situation, people enter from the door A and pass through the sensor terminals 1-2*a*, 1-2*b*, 1-2*c*, and 1-2*d* in this order. However, if people turn to the passage A and take a route from the sensor terminals 1-2*a* to 1-2*d*, the situation is determined not to be ideal. Further, the situation determining portion 301 may also determine that the flow of people is not ideal, for example, if the flow of people turning to the passage A is more frequent than the flow of people moving in the direction of the sensor terminal 1-2*b*.

Next, the improvement control portion 302 specifies the actuator devices 2 (2-1*a* to 2-1*d*, 2-2*a* and 2-2*b*, and 2-3*a* and 2-3*b*) to be controlled (Step S318), generates the predetermined control signals for obtaining the ideal flow of people, and transmits the predetermined control signals to the specified actuator devices 2 (Step S321, S327, and S333). That is, the improvement control portion 302 specifies the sensor terminal 1 arranged in the specific region determined not to have an ideal situation in terms of the motion line of people, further specifies the actuator device 2 corresponding to the specified sensor terminal 1, generates the control signal for making the motion line of people in the specific region ideal, and transmits the control signal to the specified actuator device 2.

Then, each of the actuator devices 2 (2-1*a* to 2-1*d*, 2-2*a* and 2-2*b*, and 2-3*a* and 2-3*b*) performs the predetermined control (the air conditioning control, the sound output control, or the driving control of escalator) in accordance with the received control signal (Step S324, S330, and S336).

As a specific example of the improvement control, for example, if the flow of people turning to the passage A shown in FIG. 10 becomes prominent, the control may be performed such that, in a hot day in summer, people are guided toward the sensor terminal 1-2*b* by making a sound of Furin (a Japanese wind-bell) from the speaker of the actuator device 2-2*a*, or the flow of people is facilitated toward the sensor terminal 1-2*b* by lowering the temperature setting of the air conditioning device of the actuator device 2-1*b*.

Note that the control signal for making the motion line of people in the specific region ideal may be generated and transmitted to the actuator device 2 arranged in a region other than the specific region in which the situation is desired to be improved. For example, the movement of people can be induced by bringing the region other than the specific region into an uncomfortable situation and consequently causing a relatively comfortable situation to the specific region.

Further, if the people-flow sensor of a sensor terminal 1-2*f* detects the continued presence of people wrongly entering from the door B, the improvement control portion 302 can, for example, in a hot day in summer, discourage people from entering from the door B by turning down the air conditioning device of the actuator device 2-1*d* to increase the temperature. Further, the improvement control portion 302 can bring the flow of people closer to an ideal state by turning up the air conditioning device of the actuator 2-1*a* near the door A for cooling down and thereby increasing the number of people who wish to enter from the door A.

Further, if the number of people entering from the door B and pausing is too high, the control server 3 may change the ideal flow of people in accordance with the current situation. For example, the movements of the escalator 2-3*b* and the escalator 2-3*a* are temporarily reversed to first send people entering from the door B to the second floor by the escalator 2-3*b* and then guide the people to go down by the escalator 2-3*a* after seeing the exhibitions on the second floor. In this manner, the continued presence of people near the door B can be eliminated.

Note that detection of the flow of people is not necessarily performed only by the people-flow sensor and can be performed by using a plurality of cameras. For example, if many faces are recognized on the basis of an image captured by a camera capturing images of a passage in the exhibition hall, the situation determining portion 301 can determine that people move toward that camera.

3-4. Others

In each example described above, the actuator device 2 such as the air conditioning device, the speaker, and the escalator is used to perform the control to obtain the ideal situation. However, the present disclosure is not limited thereto, and, for example, a lighting device, a signage device (a display device), and the like may be used.

In a case where the control is performed using the lighting device, for example, the place where people are expected to gather is made brighter, while the place where people are not expected to gather is made darker. Further, the control may be also performed such that light in a warm color is used in the place where people are expected to gather, while light in a cold color is used in the place where people are not expected to gather.

Further, in a case of using the signage device, the control is performed, for example, such that contents are updated in the place where people are expected to gather, while the contents are ending in the place where people are not expected to gather. Further, the control may be also performed such that the noticeable contents are used in the place where people are expected to gather, while the inconspicuous contents are used in the place where people are not expected to gather.

Further, in the present embodiment, the place situation improvement control is not necessarily performed only in an indoor place, and the place situation improvement control can be performed in an outdoor place in a similar manner. More specifically, for example, as disclosed in WO 2014/129042, the place situation improvement control according to the present embodiment can be applied to a case where people take an actual tour to the place used as a content stage of a movie, a drama, an animation, or the like while referring to provided course information. In this case, the place situation improvement control can assist the touring of the content stage with the ideal course. Note that the entire contents of WO 2014/129042 are hereby incorporated by reference.

Examples of the actuator device 2 for performing the place situation improvement control in the outdoor place include a huge electric fan, a mosquito sound generator, a cold air blowing machine, a mist blowing machine, a fountain apparatus, and the like in addition to the speaker and display device described above.

5. SUMMARY

As described above, the information processing system according to the embodiment of the present disclosure can grasp the situation of the place by means of the plurality of arranged sensors and control the arranged actuator to so as to obtain the ideal situation.

Specifically, the situation of the place can be brought closer to the ideal situation by scattering the sensor terminal group and the actuator device group in the areas, detecting the situation of the place being different from expected by the sensor terminal group, and indirectly controlling the movement of people by using the actuator device group. Further, arranging the sensor terminals and the actuator devices at fixed points makes it possible to understand the situation of the place without acquiring position information and perform the control in accordance with the situation of the place.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program that causes the hardware such as CPU, ROM, RAM and the like installed in the aforementioned sensor terminal 1, actuator device 2, or control server 3 to execute the function of the sensor terminal 1, the actuator device 2, or the control server 3. Further, a computer readable storage medium having the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a communication portion capable of receiving sensor data detected from a plurality of sensors arranged in predetermined regions and transmitting control signals to a plurality of actuators arranged around the sensors such that the actuators are, at least one by one, associated with each of the sensors; and a control portion that performs control such that the sensor arranged in a specific region determined not to have an ideal situation is specified on the basis of the sensor data detected from the plurality of sensors, the actuator corresponding to the specified sensor is specified from the plurality of actuators, and the control signal for bringing the specific region into the ideal situation is generated and transmitted to the specified actuator through the communication portion.

(2)

The information processing device according to (1), in which the control portion performs the control such that the sensor arranged in the specific region where, despite the presence of people, an excitement degree of the people is determined not to satisfy a reference value is specified on the basis of the sensor data detected from the plurality of sensors, the actuator corresponding to the specified sensor is specified from the plurality of actuators, and the control signal that controls the people in the specific region such that the excitement degree of the people satisfies the reference value is generated and transmitted to the specified actuator through the communication portion.

(3)

The information processing device according to (2), in which the plurality of sensors are at least either of cameras or microphones, the actuator is a speaker, and the control portion performs the control so as to generate a predetermined sound signal for exciting the people in the specific region and transmit the sound signal to the actuator arranged in the specific region.

(4)

The information processing device according to (1), in which the control portion recognizes the specific region where people in a number equal to or more than a predetermined reference value are desired to be present, and upon detecting that the number of the people present in the specific region does not satisfy the reference value on the basis of the sensor data detected from the sensor arranged in the specific region, the control portion performs the control such that the actuator corresponding to the sensor in the specific region is specified from the plurality of actuators, and the control signal for controlling a movement of people such that the number of the people present in the specific region satisfies the reference value is generated and transmitted to the specified actuator through the communication portion.

(5)

The information processing device according to (4), in which the control portion guides people from a region other than the specific region to the specific region by transmitting the control signal to the actuator corresponding to the sensor in the specific region and the actuator arranged in the region other than the specific region and thereby making the situation in the specific region more comfortable than the situation in the region other than the specific region.

(6)

The information processing device according to (5), in which, upon detecting, on the basis of the sensor data detected from the sensor arranged in another specific region other than the specific region, that the number of the people present in the other specific region is equal to or more than a predetermined value, the control portion guides the people from the other specific region to the specific region by transmitting the control signal to the actuator corresponding to the sensor in the specific region and the actuator arranged in the other specific region and thereby making the situation in the specific region relatively more comfortable than the situation in the other specific region.

(7)

The information processing device according to any one of (4) to (6), in which the plurality of sensors are people-flow sensors, the actuator is an air conditioning device, and the control portion performs the control so as to generate a predetermined control signal for controlling comfortability in a space by controlling at least one of a temperature, an air volume, or a humidity and transmit the predetermined control signal to the actuator.

(8)

The information processing device according to (1), in which the control portion performs the control such that the sensor arranged in the specific region determined not to have an ideal situation in terms of a motion line of people is specified on the basis of the sensor data detected from the plurality of sensors, the actuator corresponding to the specified sensor is specified from the plurality of actuators, and the control signal for making the motion line of people in the specific region ideal is generated and transmitted to the specified actuator through the communication portion.

(9)

The information processing device according to (8), in which the control portion performs the control to as to generate the control signal for making the motion line of people in the specific region ideal and transmit the control signal to the actuator arranged in a region outside the specific region through the communication portion.

(10)

The information processing device according to (8) or (9), in which the plurality of sensors are people-flow sensors, the actuator is at least one of an air conditioning device, a speaker, or an escalator, and the control portion performs the control so as to generate a predetermined control signal for controlling the comfortability in a space, a sound, or a movement direction of the escalator, and transmit the predetermined control signal to the actuator.

(11)

An information processing method including, by a processor:

receiving sensor data detected from a plurality of sensors arranged in predetermined regions by means of a communication portion capable of receiving the sensor data detected from the plurality of sensors arranged in the predetermined regions and transmitting control signals to a plurality of actuators arranged around the sensors such that the actuators are, at least one by one, associated with each of the sensors;

specifying the sensor arranged in a specific region determined not to have an ideal situation on the basis of the sensor data detected from the plurality of sensors;

specifying the actuator corresponding to the specified sensor from the plurality of actuators; and generating the control signal for bringing the specific region into the ideal situation, and transmitting the control signal to the specified actuator through the communication portion.

REFERENCE SIGNS LIST 1 (1-1, 1-2) sensor terminals
2 (2-1 to 2-3) actuator devices
3 control server
4 network
5a, 5b areas
10 sensor
11 control portion
12 communication portion
20 actuator
21 control portion
22 communication portion
30 control portion
31 communication portion
32 storage portion
301 situation determining portion
302 improvement control portion

The invention claimed is:

1. An information processing device, comprising:
a communication portion configured to:
receive sensor data from a plurality of sensors in a plurality of regions; and
transmit a plurality of control signals to a plurality of actuators, wherein each actuator of the plurality of actuators is associated with at least one sensor of the plurality of sensors; and
a control portion configured to:
calculate an average value of a plurality of excitement degrees of people in a first specific region of the plurality of regions based on the received sensor data;
determine a result of a comparison between a first reference value and the average value of the plurality of excitement degrees of the people in the first specific region;
determine whether the first specific region has an ideal situation based on the result of the comparison between the first reference value and the average value of the plurality of excitement degrees of the people in the first specific region, wherein the ideal situation includes a specific situation that corresponds to at least one of a flow of a specific number of the people, a motion line of the people, a conversation among the people, or continued presence of the people;
specify a first sensor, of the plurality of sensors, in the first specific region based on the determination that the first specific region does not have the ideal situation;
specify a first actuator, corresponding to the specified first sensor, from the plurality of actuators, wherein the first actuator is a speaker;

generate information, in the first specific region, that includes a conversation topic;
generate a first control signal of the plurality of control signals to control the specified first actuator, such that the first specific region has the ideal situation, wherein
the specified first actuator is controlled to output the generated information in the first specific region, and
the generated information is output to initiate the conversation among the people in the specified first region; and
control the communication portion to transmit the generated first control signal to the specified first actuator.

2. The information processing device according to claim 1, wherein
the plurality of sensors includes at least one of a plurality of cameras or a plurality of microphones.

3. The information processing device according to claim 1, wherein the control portion is further configured to:
determine that, in a second specific region of the plurality of regions, a first number of people one of equal to a second reference value or more than the second reference value are expected to be present;
detect that the first number of people in the second specific region is lower than the second reference value, based on the received sensor data corresponding to the second specific region;
specify a second actuator from the plurality of actuators based on the detection, wherein
the second actuator corresponds to a second sensor, of the plurality of sensors, in the second specific region; and
generate a second control signal to control a movement of a second number of people such that the first number of people present in the second specific region satisfies the second reference value.

4. The information processing device according to claim 3, wherein
the control portion is further configured to control the communication portion to transmit the second control signal to the second actuator and a third control signal of the plurality of control signals to a third actuator of the plurality of actuators,
the third actuator is in a third specific region of the plurality of regions,
the third specific region is different from the second specific region,
the third control signal and the second control signal are transmitted to guide the second number of people from the third specific region to the second specific region, and
the third control signal is transmitted to the third actuator and the second control signal is transmitted to the second actuator such that a situation in the second specific region is more comfortable than a situation in the third specific region.

5. The information processing device according to claim 4, wherein the control portion is further configured to:
detect, based on the received sensor data corresponding to the third specific region, that a third number of people in the third specific region is one of equal to a specific value or more than the specific value; and
control the communication portion to transmit the third control signal to the third actuator and the second control signal to the second actuator based on the detection that the third number of people in the third specific region is one of equal to the specific value or more than the specific value.

6. The information processing device according to claim 3, wherein
the plurality of sensors are people-flow sensors,
the second actuator is an air conditioning device, and
the control portion is further configured to:
generate the second control signal to control at least one of an air volume or a humidity for comfortability in the second specific region; and
control the communication portion to transmit the generated second control signal to the air conditioning device.

7. The information processing device according to claim 1, wherein the control portion is further configured to:
determine whether a second specific region of the plurality of regions is in the ideal situation for the motion line of the people, based on the received sensor data corresponding to the second specific region;
specify a second sensor, of the plurality of sensors, in the second specific region based on the determination that the second specific region is not in the ideal situation for the motion line of the people;
generate a second control signal of the plurality of control signals such that the second specific region has the ideal situation for the motion line of the people in the second specific region; and
control the communication portion to transmit the generated second control signal to a second actuator of the plurality of actuators, wherein the second actuator corresponds to the second sensor.

8. The information processing device according to claim 7, wherein the control portion is further configured to:
generate a third control signal of the plurality of control signals such that the second specific region has the ideal situation for the motion line of the people in the second specific region; and
control the communication portion to transmit the generated third control signal, to a third actuator in a third specific region outside the second specific region, wherein
the plurality of actuators includes the third actuator, and
the plurality of regions includes the third specific region.

9. The information processing device according to claim 7, wherein
the plurality of sensors are people-flow sensors,
the second actuator is at least one of an escalator or an air conditioning device, and
the control portion is further configured to:
generate the second control signal to control at least one of comfortability in a space or a movement direction of the escalator; and
control the communication portion to transmit the generated second control signal to the at least one of the escalator or the air conditioning device.

10. An information processing method, comprising:
receiving, by a communication portion, sensor data from a plurality of sensors in a plurality of regions;
transmitting, by the communication portion, a plurality of control signals to a plurality of actuators, wherein each actuator of the plurality of actuators is associated with at least one sensor of the plurality of sensors;

calculating, by a processor, an average value of a plurality of excitement degrees of people in a specific region of the plurality of regions based on the received sensor data;

determining, by the processor, a result of a comparison between a reference value and the average value of the plurality of excitement degrees of the people in the specific region;

determining, by the processor, whether the specific region has an ideal situation based on the result of the comparison between the reference value and the average value of the plurality of excitement degrees of the people in the specific region, wherein the ideal situation includes a specific situation that corresponds to at least one of a flow of a specific number of the people, a motion line of the people, a conversation among the people, or continued presence of the people;

specifying, by the processor, a sensor in the specific region based on the determination that the specific region does not have the ideal situation, wherein the sensor is specified from the plurality of sensors;

specifying, by the processor, an actuator, corresponding to the specified sensor, from the plurality of actuators, wherein the actuator is a speaker;

generating, by the processor, information in the specific region, wherein the information includes a conversation topic;

generating, by the processor, a control signal of the plurality of control signals to control the specified actuator, such that the specific region has the ideal situation;

wherein
the specified actuator is controlled to output the generated information in the specific region, and
the generated information is output to initiate the conversation among the people in the specified region; and controlling, by the processor, the communication portion to transmit the generated control signal to the specified actuator.

* * * * *